Patented Oct. 17, 1939

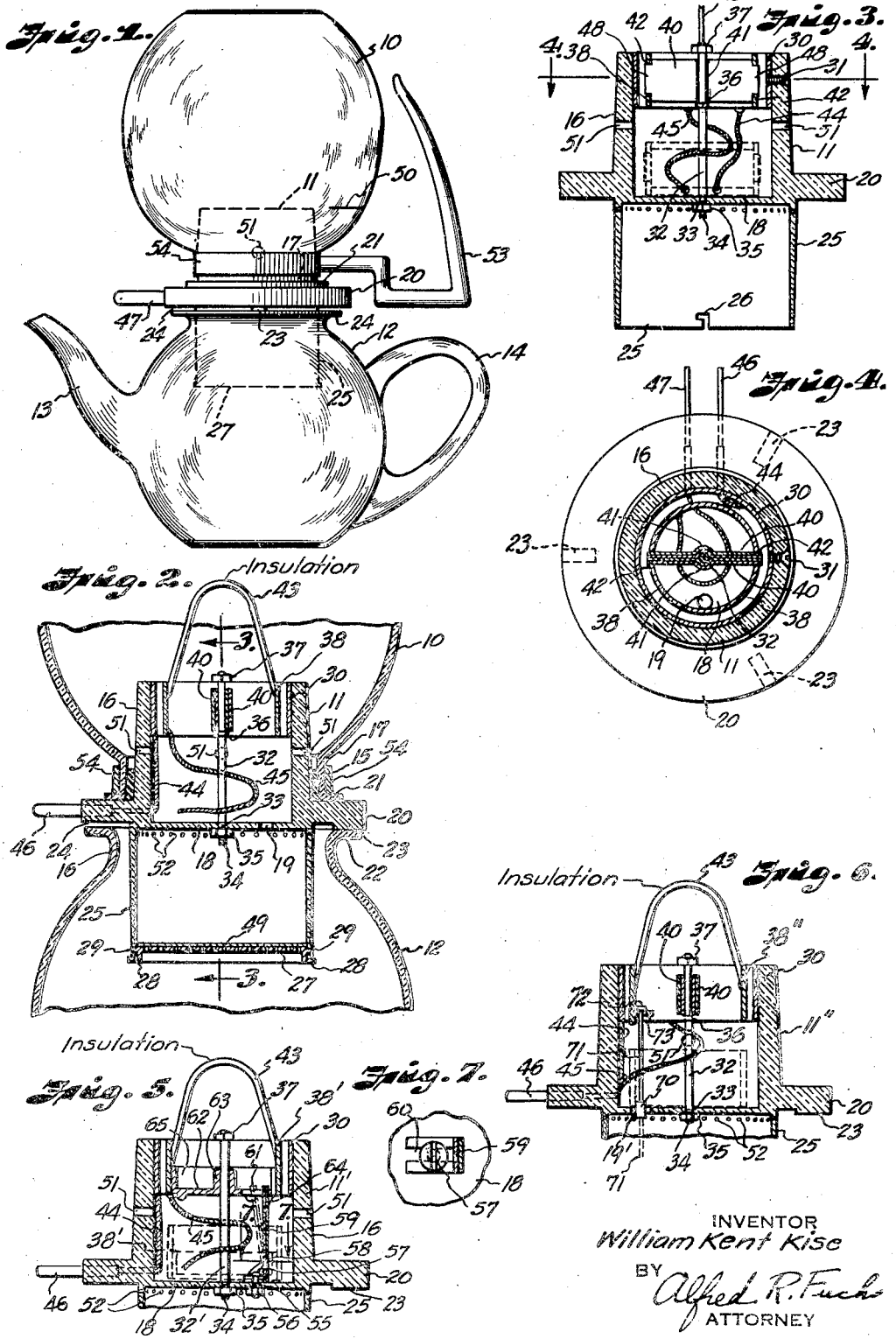

2,176,081

UNITED STATES PATENT OFFICE 2,176,081

ELECTRIC COFFEE MAKER

William Kent Kise, Kansas City, Mo.

Application September 5, 1936, Serial No. 99,603
Renewed March 27, 1939

15 Claims. (Cl. 219—44)

My invention relates to electric coffee makers, and more particularly to electrical means for brewing coffee that is provided with means whereby the heating and feeding of the water utilized for brewing the coffee is controlled so that only water of the right temperature to obtain coffee of the most desirable character will be produced by said device.

Scientific experimentation has shown, that in order to obtain the most perfect flavor for coffee and to prevent the extraction from the ground coffee of undesirable acids and other ingredients that spoil the flavor and produce harmful effects on the coffee drinker, it is necessary to have the water that comes in contact with the ground coffee at a temperature that will extract all of the aroma from the coffee without extracting these undesirable ingredients. Such a temperature can be definitely determined and is a temperature slightly below the boiling point of water. It is accordingly one of the principal purposes of my invention to provide means for heating water and feeding the heated water to the ground coffee in such a manner that substantially no water at a temperature too low to extract the desirable flavor producing aromatic oils and fragrant ethers from the ground coffee and no water at a temperature so high that it will extract the undesirable ingredients from the coffee will contact the ground coffee. To accomplish this purpose I provide new and improved means for heating water and for feeding the heated water from the heating means to the ground coffee.

My improved means for water heating and feeding water at a predetermined temperature, is adaptable for use generally where water at a certain temperature only is to be fed to any material, or any apparatus, but is generally adapted for use in making what is known as "drip" coffee. The combined heating and feeding means comprises a water chamber, or container, that is provided with an opening, through which the water is normally not discharged, because the partial vacuum in the container will tend to prevent the discharge of the water through such opening. This container is associated with heating means within the same, the action of said heating means in heating the water in the container being thermostatically controlled, and the method of heating the water is such that when the heating process has continued to a predetermined point, pressure will be built up in the container sufficient to overcome the atmospheric pressure that is maintaining the body of water in the container to cause the gradual discharge of the water through the discharge opening. The container is, preferably, so constructed and proportioned, that the body of water will decrease sufficiently in depth, by the time the desired temperature has been reached and the thermostat has acted to increase the separation of the electrodes used to heat the water by electrolysis to materially decrease the heating effect of the electrical heating means, that the body of water will not be a sufficient impediment to the passing of bubbles of air from outside the container into the container through the discharge opening and through the body of water in the container, although the pressure has been relieved by the discharge of water through the discharge opening, and the discharge of water will continue through said discharge opening.

More specifically my invention comprises a water chamber, or water container, forming a heating chamber that is sealed except for a discharge opening of small diameter in the bottom thereof and which has electrical means for heating the water comprising a pair of electrodes immersed in the water, but spaced so that the water will be heated due to the resistance thereof between the two electrodes, and in which the flow of current between the electrodes will cause electrolysis of the water to take place, producing gases and water vapor, which will bubble up through the body of water into the top of said chamber and expansion of the water itself, increasing the pressure in the chamber and the hydrostatic pressure of the water throughout the body thereof, which will cause, when said pressure has been sufficiently built up, the discharge of water through said discharge opening. It will be obvious that the spacing of the electrodes can be so arranged that this pressure condition will be reached when the water in the chamber has reached a predetermined temperature, due to the heating effect of the current passing through the same between the electrodes, and that in this manner a very finely adjustable automatically operating means is provided for heating and discharging water from a chamber at a desired temperature.

In order to maintain said predetermined desired temperature of the water in the chamber and prevent the water from being heated above said temperature, thermostatic means is provided for regulating the heating effect of the electrical heating means for the water, and also the production of gases by electrolysis, due to the passing of the current between the electrodes. To accomplish this one of the electrodes is made movable relative to the other electrode, and the thermostatic means normally holds the electrodes in such spaced relationship as to produce the heating effect first desired to heat the water to the desired temperature, and releases said electrode to permit the same to move by gravity to a position such that the space between the electrodes will be greatly increased, increasing the resistance between the electrodes, reducing the amount of current passing between the same and thereby reducing the heating effect of the current and of the electrolytic action thereof to a relatively small amount. This spacing can be so regulated that the amount of current that will pass between the electrodes when this greater spacing of the electrodes is obtained by means of the acting of the thermostat, will merely maintain the water in the heating chamber at the desired temperature, but will not heat the same beyond the temperature that is desired for the most efficient extraction of the desired aromatic oils and fragrant ethers from the coffee.

It will be obvious that an apparatus of the general character referred to above can be utilized for heating water and feeding such water at a predetermined temperature from a heating chamber, no matter for what purpose the same may be used, and that I have provided a device in which the water is heated in a water containing chamber, or reservoir, the reservoir and heating chamber being the same, and in which the heating is accomplished by means of electrodes spaced from each other, located in the water, producing electrolysis, which electrolysis building up pressure from gases formed and from expansion of the water, is utilized to automatically cause the discharge of the water from the container at the proper temperature.

While it is ordinarily not necessary to provide any means for controlling the discharge of the water from the above mentioned combined reservoir and heating chamber, other than the thermostatically controlled heating means itself, yet it may be desired to provide means responsive to the thermostatic means for varying the size of the discharge opening so as to increase the same when the thermostatic element responds to the rise in temperature to the predetermined point to cause increased resistance between the electrodes by the separation of the electrodes to the wider spacing thereof, above referred to.

It is still a further purpose of my invention to provide a device of the above mentioned character, in conjunction with which is provided a container for ground coffee, located in such a manner that the heated water discharged from the heating chamber will be discharged onto the ground coffee in such a manner that it will gradually pass through the same and extract the aromatic oils and fragrant ethers, that it is desired to obtain from the ground coffee, therefrom. The rate at which the water is discharged can be controlled by the design of the heating chamber reservoir and the heating means, and additionally controlled by the means for controlling the size of the discharge opening from said heating chamber reservoir, if this is desired.

Another important purpose of my invention is to provide an electric coffee maker that will automatically close the circuit to set the device in operation when the same is placed in coffee making position and will automatically open the circuit to shut off the current when the coffee making operation is completed. This is accomplished due to the arrangement of the electrodes in the water container, which do not come in contact with the water until the container is turned into the position which it assumes during operation of the device, and due to the fact that the water container empties tiself, breaking the circuit between the electrodes when the water is heated to the proper temperature and passes out of the container through the ground coffee to brew the coffee.

It is another important purpose of my invention to provide an electric coffee making device that purifies the water that is utilized for making the coffee. The impurities in water are principally constituents that will be precipitated during the electrolysis of the water. During the heating operation that is produced by the electrodes the water is agitated and instead of the precipitates settling to the bottom of the container for the water, these will tend to form a scum on the top and will settle along the sides of the container as the water passes out of the same after it has been heated to the proper temperature. As a result practically all of the impurities that have been separated by the electrolysis adhere to the container and do not pass into the ground coffee holding portion of the device. The very small amount of such precipitated material that might pass through the very small opening in the bottom of the water container will be filtered out by the ground coffee in the coffee container and the filter paper therein.

Other objects and advantages of my invention will appear as the description of the drawing proceeds. I desire to have it understood, however, that I do not intend to limit myself to the particular details shown or described, except as defined in the claims.

In the drawing:

Fig. 1 is a view in side elevation of my improved electric coffee maker.

Fig. 2 is a fragmentary vertical sectional view thereof on a slightly enlarged scale.

Fig. 3 is a section taken on the line 3—3 of Fig. 2, the perforated bottom of the coffee holding portion being removed.

Fig. 4 is a section taken on the line 4—4 of Fig. 3.

Fig. 5 is a view similar to Fig. 3 of a slightly modified form of the invention.

Fig. 6 is a vertical sectional view of the electrode carrying member, showing a further modification, and Fig. 7 is a fragmentary section taken substantially on the line 7—7 of Fig. 5.

Referring in detail to the drawing, my improved electric coffee maker comprises a water container having a body portion 10, preferably, made of glass, or similar transparent material, and an electrode carrying member 11 cooperating with the body portion 10 to provide a container that is sealed from the outside atmosphere except for a single small opening, and the coffee maker further comprising a bottom receptacle 12, or receiver for the brewed coffee, which may be also made of glass, or similar transparent material, if desired. The lower member 12 may be provided with a spout 13 and with a handle 14.

Suitable compressible sealing means 15 is provided for sealing the joint between the body portion 10 and the contact carrying member 11 forming the separate parts of the water container, the outer face 16 of the tubular body portion of the member 11 being tapered, as clearly shown in the drawing, to provide a taper fit between the gasket 15, said member 11 and the neck portion 17 on the body portion 10 of said water container, said neck portion 17 also tapering on the container shown, although this is not absolutely necessary. The member 11 is provided with a transverse wall portion 18 forming a bottom wall for the water container in which a small opening 19 is provided. Said opening is made of suitable size to obtain the desired results from any device referred to above, and constitutes the only opening into the container for the water when the device is placed in operative condition. The member 11 is, preferably, made of material of a character that is an electrical insulator and which has no deleterious effect on the coffee, preferably glass or ceramic material. The member 11 has an annular flange 20, which the rim portion 21 of the body portion 10 of the water container engages, and which is also engaged by the top flange 22 of the coffee receiver 12. Lugs 23 are cast on the flange 20, which engage with the flange 22 so as to provide a space 24 between said flanges, through which communication between the interior of the receiver 12 and the outside air is maintained at all times. The body portion 11 is provided with an annular flange 25 projecting downwardly therefrom, which is provided with suitable means, such as bayonet grooves 26, for securing a perforated bottom plate 27 thereto, said annular flange forming the side wall of a ground coffee container depending below the wall 18 having a perforated bottom provided by the plate 27. Said bottom plate has an offset flange 28 fitting around the bottom edge of the wall 25 and has projections 29 thereon entering the bayonet grooves 26 to secure said plate 27 in position on the member 11.

Mounted within the open topped body portion of the member 11 is a fixed electrode 30 of arcuate form, the same being shown as being cylindrical in form in the drawing. Said electrode 30 is made of any suitable metal that will not rust or otherwise corrode in use and is secured in fixed position in the body portion 11 in any desired manner, as by means of the countersunk screw 31. Fixed centrally in the transverse wall portion 18 and extending upwardly therefrom is a post-like member 32, which has a reduced portion 33 extending through an opening in the wall 18 and is screw threaded at 34 to receive a nut 35 so as to be rigidly secured to said wall 18 between the shoulder formed by said reduced portion and the nut 35. The wall 18 forms the bottom of the water container, which constitutes a combination water container and water heating chamber, and the post-like member 32 extends perpendicularly to said bottom upwardly into the container. Said post-like member is provided with an annular enlargement 36 providing a shoulder spaced from the upper end thereof and is threaded at its upper end to receive a nut 37.

The nut 37 acts as a stop limiting upward movement of a movable electrode 38, which is also arcuate in form. The arcuate electrode 38 is mounted on the post-like member 32 by means of a pair of bimetallic thermostatic elements 40, the same being made in the usual manner of two strips of metal having different co-efficients of expansion, and are each provided with curved oppositely offset portions 41 centrally thereof extending around the post-like member 32. Said thermostatic elements 40 are so made and the shape of the curved post engaging portions 41 is such that said elements will engage the post-like member 32 with sufficient closeness, when the said thermostatic elements are substantially at atmospheric temperature, that the same have to be forced past the shoulder 36 on the member 32 in order to pass the same, but said elements, upon rise in temperature to the desired degree to which the water in the water container is to be heated, will expand, and in expanding will be bowed outwardly away from each other sufficiently that the curved holding portions 41 will be moved away from the post-like member 32 and the thermostatic elements will then readily pass over the shoulder 36. Preferably, the post-like member 32 is made slightly smaller below the enlargement 36 than above it so that there will be no impediment to the movement of the movable electrodes 38 downwardly after passing said enlargement 36.

The thermostatic elements 40 have reduced end portions 48 that are secured in slots 42 at diametrically opposite points in the electrode 38 so that said end portions of said elements 40 are held from movement toward and away from each other, preferably, being in face to face relation. The ends of said elements are, however, not fixed in the slots, but have slight movement therein to permit the ready bending of the same into the shape which the same will assume during expansion of the paired elements of each thereof during the rise in temperature of the water in the container. It will thus be seen that the movable electrode 38 will be held in the position shown in Fig. 2, and shown in Figs. 3 and 5 in full lines, when manually moved into such position, and will remain in such position until the thermostatic means acts.

A suitable handle 43 of electrical insulating material is provided on said movable electrode 38 so that the same can be manually moved into the position shown in Fig. 2 and shown in full lines in Figs. 3 and 5. A conductor 44 extends to the fixed electrode 30 and a conductor 45 extends to the movable electrode 38. The conductors 44 and 45 are connected respectively with projecting contacts in the form of prongs 46 and 47, which are engageable in the usual manner with any suitable electrical outlet, or plug, of the usual electrical distribution circuit, or any other suitable means may be provided for connecting the conductors 44 and 45 with such a circuit.

In operation the body portion 10 of the water container is first filled with water to a predetermined desired point in an inverted position from that shown in Figs. 1 and 2, that is, with the mouth portion 21 thereof upwardly. The sealing means 15 and contact carrying member 11 are then engaged with the body portion 10 in such inverted position to complete the closed water container. Ground coffee is then placed within the wall portion 25 of the member 11, the wall 18 in this position also serving as the bottom of the ground coffee container. A filter paper 49 is then placed across the top of the portion 25, and the perforated member 27 is then placed in position, the lugs 29 engaging with the grooves 26 to lock said perforated member 27 in position against the filter paper and ground coffee container 25. The apparatus is then turned over into its operative position, or that shown in Figs. 1 and 2. The entire water container, with its depending ground coffee holding portion 25, is then placed in position on the annular ledge 22 provided on the coffee receiver 12 with the ground coffee holding portion extending down into the upper portion of the member 12. The circuit having been previously connected by connecting the opposite terminals of a distribution circuit with the prongs 46 and 47, the circuit will be completed through the device when the water comes in contact with the electrodes, this taking place only when the device is inverted into the position shown in the drawing, due to the fact that the body portion 10 of the combination water container and heating chamber is not filled completely with water when in the reverse position from that shown in the drawing, but only to the mark 50 provided on the member 10 to indicate the water line, or maximum limit for filling with water.

The heating of the water then proceeds until the desired temperature of the water is reached, this being determined definitely in the design and assembly of the device so that the thermostatic means will operate to release the movable electrode 38 at the desired temperature, causing the same to drop to the dotted position shown in Fig. 3 of the drawing by the action of gravity, spacing the electrodes widely apart and increasing the resistance of the circuit so that the flow of current through the water will be reduced. However, the circuit will not be broken and the water will be heated sufficiently by the current passing through the same between the widely spaced electrodes to maintain the desired temperature thereof, the apparatus being so designed that the spacing will be such that this will occur. After the water is heated and shortly before the thermostat acts, discharge of water will occur through the opening 19 into the chamber formed within the wall 25 onto the ground coffee therein and will pass through the bed of ground coffee and the filter paper 29 and the perforated plate 27 into the coffee receiver 12. This will continue until the water container is emptied, the complete emptying of the water container being assured due to the provision of the openings 51 in the upwardly extending tubular portion of the member 11.

A row of small openings 52 is provided in the wall 25 adjacent the wall 18 so that air may pass either into the ground coffee containing portion of the device, or out of such ground coffee containing portion as may be found to be necessary to permit free gravity flow of the water through the ground coffee, said openings also serving as overflow openings in case the water should flow too rapidly into the ground coffee containing portion through the opening 19. The same are made small enough that these will serve to strain the water if any should escape therethrough, so that none of the ground coffee will pass out with such water. The upper body portion 10 of the water container may be provided with a handle 53, which has a band portion 54 encircling the neck portion 17 to secure the handle in position on said body portion 10.

It will be obvious that when the water container is entirely emptied, there will be no more flow of current between the electrodes, the same being automatically shut off due to the breaking of the circuit when the water passes away from between said electrodes, this occurring as soon as the depth of the water has decreased to a point below the bottom of the electrode 30.

In Figs. 5 and 7 a slight modification of the invention is shown, in which the member 11', which is made substantially the same as the member 11 except for the provision of an additional opening 55 therein, is provided. Said member 11' is otherwise made substantially in the same manner as previously described and the same reference numerals are applied to the corresponding parts in Figs. 5 and 7 as in the form of the invention shown in Figs. 1 to 4, inclusive. The fixed electrode 30 is held in the same manner as previously described, and the conductors 44 and 45 extend to the electrodes 30 and 38' in the same manner as to the electrodes 30 and 38 in the previously described form of the invention. The operation of the device is exactly the same except for the movement of the thermostatic means into and out of holding position, said thermostatic element acting in the same manner as previously described to release the movable electrode 38' to permit the same to drop to a position where it only maintains the water at a predetermined temperature and does not heat it to any higher temperature, just as in the previously described form of the invention. However, said thermostatic holding means for the movable electrode is somewhat differently constructed and arranged. A bolt-like member 56 extends through the opening 55 and has the head portion 57 thereof engaging with the upper face of a transversely extending end portion 58 provided on the thermostatic element 59. Said end portion is slotted, as indicated at 60, to receive the shank portion of the bolt-like member 56 and the thermostatic element is made of a pair of metallic members that have different coefficients of expansion and will cause said element to bend upon expansion of the two different metallic parts of the device so as to tend to move toward the left in Fig. 5. The upper end portion of the thermostatic element 59 extends through a slot 61 provided in a mounting member 62 for the movable electrode 38, said mounting member having a central hub portion 63 that is slidably engaged with the post-like member 32', said post-like member being the same as the member 32, previously described, except that it has no enlargement thereon corresponding to that shown at 36 in Figs. 1 to 4, inclusive, the post-like member acting merely as a guide to guide the movements of the movable electrode 38' so as to keep the same at the proper spacing from the fixed electrode 30. Said movable electrode 38' is secured to the member 62 in any desired manner. A lug, or projection, 64 is provided on the thermostatic element 59 that engages under the rim portion 65 of the member 62 and will move away from engagement therewith in alignment with the slot 61 when the thermostatic element 59 moves to the dotted line position shown in Fig. 5 due to expansion of the two metallic members comprising said thermostatic element, causing the movable electrode 38' to drop to the dotted line position shown in Fig. 5. The thermostatic element is of such construction and so located that it will not interfere with the movement of the member 38' when it has been moved into its position assumed upon the water reaching the desired temperature, previously mentioned.

This form of the invention operates in exactly the same manner as previously described with respect to controlling the heating of the water, and the discharge of the same from the water container through the ground coffee into the coffee receiver and the member 11', with the parts carried thereby, is utilized in the same manner in connection with the members 10 and 12 as is the member 11, which use thereof and the manner of operating the same have been previously described for said member 11.

In Fig. 6 another modification of the invention is shown. The member 11'' is made in the same manner as the member 11 except for the opening for the discharge of the water therefrom, said opening 19' being made somewhat larger than the opening 19, previously described. The mounting of the movable and stationary electrodes is exactly the same as described in connection with Figs. 1 to 4, inclusive, and the other parts of the device are made in the same manner as previously described, the same reference numerals being applied thereto, except for the movable electrode 38'', which is provided with means for securing a member thereto for varying the size of the opening 19', said means comprising a plug-like member 70 provided with a stem portion 71 having a head 72 thereon, said stem portion being slidably mounted in an opening provided in the ear 73 on said movable electrode 38''. The plug portion 70 does not close the opening 19' when in the position shown in Fig. 6, there being a passage between the wall of the opening 19' and the plug 70 all around the same, that is large enough that when the pressure in the water container increases in the manner previously described, the water will be discharged between the plug-like member 70 and the wall of said opening 19'. However, in order to more closely regulate the discharge of the water and assure the passage of all of the water out of the water container in a more rapid manner than would be the case otherwise, the opening 19' is made of much larger size than the opening 19 and will be opened fully when the plug 70 is moved away therefrom, which will occur when the thermostatic element acts to release the movable electrode 38'', causing said electrode 38'' to drop down to the dotted position shown in Fig. 6.

When such occurs the plug-like member 70, which has been supported in the opening in the member 19' by means of the movable thermostatic element 38'', will drop downwardly due to the action of gravity into the ground coffee container until the same either reaches the lowermost position that it can assume, or until the same engages with some of the ground coffee. Such engagement with the ground coffee will not interfere with the movement of the electrode 38'', however, because of the lost motion connection between the member 71 and the ear 73. It will be obvious that when the member 38'' is moved to the position shown in full lines in Fig. 6 manually by means of the insulating handle 43, the plug-like member 70 will be restored to its position in the opening 19', again reducing said opening to the size desired to prevent water from passing through the same until said water has been heated to its desired temperature.

What I claim is:

1. Apparatus of the character described comprising a water container, a pair of spaced electrodes therein, one of said electrodes being movable relative to the other thereof, said other electrode being stationary, and thermostatic means for holding said movable electrode in a predetermined spaced relation from said other electrode, said means being releasable responsive to a predetermined temperature to permit said movable electrode to move to a position at a greater distance from said other electrode, said movable electrode being irresponsive to thermostatic means after movement to such position.

2. Apparatus of the character described, comprising a water container sealed except for a small opening in the bottom thereof, a fixed electrode in said container, a movable electrode in said container having alternative positions one near said fixed electrode, the other remote from said fixed electrode, and temperature responsive means holding said movable electrode in the position thereof near said fixed electrode releasable to permit said movable electrode to move to the other position thereof upon the water in said container reaching a predetermined temperature, said movable electrode being out of the control of said temperature responsive means after release thereof.

3. Apparatus of the character described, comprising a water container sealed except for a small opening in the bottom thereof, a fixed arcuate electrode in said container, a movable arcuate electrode in said container substantially concentrically arranged relative to said fixed electrode, said movable electrode being movable axially relative to said fixed electrode into alternative positions and having a tendency to move into a position widely spaced from said fixed electrode, and temperature responsive means holding said movable electrode in a position opposite said fixed electrode releasing said movable electrode to permit the same to move to said widely spaced position upon the water in said container reaching a predetermined temperature.

4. Apparatus of the character described, comprising a water container sealed except for a small opening in the bottom thereof, a fixed arcuate electrode in said container, a movable arcuate electrode in said container substantially concentrically arranged relative to said fixed electrode, said movable electrode being movable axially relative to said fixed electrode into alternative positions and having a tendency to move into a position widely spaced from said fixed electrode, and temperature responsive means holding said movable electrode in a position opposite said fixed electrode and releasing said movable electrode to permit the same to move to said widely spaced position upon the water in said container reaching a predetermined temperature, said container comprising a body portion, an electrode carrying member providing a bottom closure for said body portion and having said opening therein and means for sealing the joint between said body portion and said electrode carrying member.

5. Apparatus of the character described, comprising a water container sealed except for a small opening in the bottom thereof, a fixed arcuate electrode in said container, a movable arcuate electrode in said container substantially concentrically arranged relative to said fixed electrode, said movable electrode being movable axially relative to said fixed electrode into alternative positions and having a tendency to move into a position widely spaced from said fixed electrode, and means for holding said movable electrode in a position opposite said fixed electrode against the tendency to move to said widely spaced position, comprising temperature responsive means releasing said movable electrode from said temperature responsive means to permit the same to move to said widely spaced position upon the water in said container reaching a predetermined temperature, said electrodes being mounted in said container near the bottom thereof.

6. In an electric coffee maker, a water container closed except for a constantly open outlet in the bottom thereof, a stationary electrode in said water container, a movable electrode in said water container, means for mounting said movable electrode for guided movement between a raised position thereof in proximity to said stationary electrode and a lowered position spaced at a greater distance from said stationary electrode, means in said water container to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, a handle on said movable electrode, the mounting for said electrodes being removable from said container to provide a fill opening for said container and to obtain access to said handle, a perforated coffee basket depending from said container and a removable closure for said coffee basket.

7. In an electric coffee maker, a water container closed except for a constantly open outlet in the bottom thereof, temperature responsive means for increasing the size of said opening when the water in said container reaches a predetermined temperature, a stationary electrode in said water container, a movable electrode in said water container, means for mounting said movable electrode for guided movement between a raised position thereof in proximity to said stationary electrode and a lowered position spaced at a greater distance from said stationary electrode, means in said water container to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, a handle on said movable electrode, the mounting for said electrodes being removable from said container to provide a fill opening for said container and to obtain access to said handle, a perforated coffee basket depending from said container and a removable closure for said coffee basket.

8. In an electric coffee maker, a water container closed except for a single opening in the bottom thereof, a stationary electrode in said water container, a movable electrode in said water container, means for mounting said movable electrode for guided movement between a raised position thereof in proximity to said stationary electrode and a lowered position spaced at a greater distance from said stationary electrode, means in said water container to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, a handle on said movable electrode, the mounting for said electrodes being removable from said container to provide a fill opening for said container and to obtain access to said handle, a valve member for said opening, means for mounting said valve member for movement with said movable electrode, a perforated coffee basket depending from said container and a removable closure for said coffee basket.

9. In an electric coffee maker, a water container having an imperforate body portion provided with an open mouth, a closure member engaging said mouth to provide a bottom for said container upon inversion thereof, means providing a liquid tight seal between said closure member and said container, said closure having an opening therein providing a constantly open small outlet therein, a stationary electrode in said water container, a movable electrode in said water container, means on said closure member for mounting said movable electrode for guided movement between a raised position thereof in proximity to said stationary electrode and a lowered position spaced at a greater distance from said stationary electrode, means on said closure member to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, a handle on said movable electrode and a perforated coffee basket depending from said closure member comprising removable means providing entrance to the interior thereof.

10. An apparatus of the character described comprising a water container closed except for a constantly open outlet in the bottom thereof, a stationary electrode in said water container, a movable electrode in said water container, means for mounting said movable electrode for guided movement between a raised position thereof in proximity to said stationary electrode and a lowered position spaced at a greater distance from said stationary electrode, means in said water container to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, and an insulated handle on said movable electrode, the mounting for said electrodes being removable from said container to provided a fill opening for said container and to obtain access to said handle.

11. An apparatus of the character described comprising a water container closed except for a constantly open outlet in the bottom thereof, temperature responsive means for increasing the size of said opening when the water in said container reaches a predetermined temperature, a stationary electrode in said water container, a movable electrode in said water container, means for mounting said movable electrode for guided movement between a raised position thereof in proximity to said stationary electrode and a lowered position spaced at a greater distance from said stationary electrode, means in said water container to hold said movable electrode in said raised position comprising a temperature responsive element, means supporting said movable electrode in its lowered position, said movable electrode being movable from its raised to its lowered position by gravity upon release thereof by said holding means, said movable electrode being mounted to permit manual movement thereof toward said stationary electrode, and an insulated handle on said movable electrode, the mounting for said electrodes being removable from said container to provide a fill opening for said container and to obtain access to said handle.

12. An apparatus of the character described comprising a water container having an imperforate body portion provided with an open mouth, a closure member engaging said mouth to provide a bottom for said container upon inversion thereof, means providing a liquid tight seal between said closure member and said container, said closure member having an opening therein providing a constantly open small outlet therein, a stationary electrode in said water container, a movable electrode in said water container, means on said closure member to hold said movable electrode in a raised position adjacent said stationary electrode comprising a temperature responsive element, means supporting said movable electrode in a lowered position, said movable electrode being movable from its raised to its lowered position by gravity upon release thereof by said holding means, said movable electrode being mounted to permit raising thereof into proximity to said stationary electrode, and an insulated handle on said movable electrode for raising the same.

13. In an electric coffee maker, an upper water container having a body portion provided with an open end through which said container may be filled, a closure for said open end forming the bottom of said container upon inversion of said body portion, said bottom closure having a single discharge opening therein opening directly into said upper container, sealing means between said container and closure, electrodes in said container for heating the water therein, a perforated coffee basket depending from said closure, a lower container having an open end and means on said closure engaging said open end, said coffee container having perforations in the bottom thereof and also near the top thereof.

14. In an apparatus for making coffee, a water container comprising a body portion having an imperforate end wall integral with the side wall thereof and having a fill opening in the other end thereof, a closure for said fill opening having a restricted constantly open discharge opening therein, and a water tight seal between said body portion and said closure, said water container being adapted to be filled through said fill opening and inverted after filling to cause said closure to form the bottom of said container, means in said container for heating the water therein to a predetermined temperature and build up and maintain a pressure in said container to discharge the water through said restricted opening, and a coffee holder depending from said closure, said water container being sealed in inverted position against escape of vapor under pressure or water except through said bottom member.

15. In an apparatus for making coffee, a water container comprising a body portion having an imperforate end wall integral with the side wall thereof and having a fill opening in the other end thereof, a closure for said fill opening and a water tight seal between said body portion and said closure, said water container being adapted to be filled through said fill opening and inverted after filling to cause said closure to form the bottom of said container, means in said container for electrolyzing and heating the water therein to a predetermined temperature, outlet means through the bottom of said container, comprising a constantly open restricted passage and a valve opening after a predetermined pressure has been built up in said water container, said heating means being mounted to continue to heat said water after said valve opens, said restricted opening and heating means cooperating to maintain the pressure and temperature of the water discharged from said water container between a predetermined maximum and minimum, and a coffee holder depending from said closure.

WILLIAM KENT KISE.